United States Patent [19]
Osborne

[11] 3,801,215

[45] Apr. 2, 1974

[54] AXIAL THRUST LIMITING DEVICE

[75] Inventor: William C. Osborne, Seneca Falls, N.Y.

[73] Assignee: Goulds Pumps Incorporated, Seneca Falls, N.Y.

[22] Filed: Aug. 2, 1972

[21] Appl. No.: 277,341

[52] U.S. Cl. ............................. 415/131, 415/501
[51] Int. Cl. ....................... F01d 25/16, F04d 29/20
[58] Field of Search........ 415/199 C, 500, 501, 172, 415/503, 131; 308/236, 184 R, 187.1

[56] References Cited
UNITED STATES PATENTS

| | | | |
|---|---|---|---|
| 1,944,291 | 1/1934 | Lundvall | 308/236 |
| 2,504,776 | 4/1950 | Woodfield et al. | 308/184 R |
| 2,775,945 | 1/1957 | Arutunoff | 415/172 |
| 3,355,766 | 12/1967 | Causemann | 308/187.1 |
| 3,380,162 | 4/1968 | Heathe | 415/503 |

Primary Examiner—Henry F. Raduazo
Attorney, Agent, or Firm—Bean & Bean

[57] ABSTRACT

In a multi-stage centrifugal pump having pairs of co-operating diffusers and impellers with associated bearing means and characterized in that the impellers are keyed for rotational movement with and axial floating movement relative to a pump shaft and that while an impeller remains in a floating condition its thrust load is transferred through its associated bearing means to its cooperating diffuser and when in a non-floating condition its thrust load is applied to the pump shaft and thereby to an axial thrust bearing therefore after wearing of its associated bearing means prevents transfer of its thrust load to its cooperating diffuser as aforesaid, the improvement for prolonging the overall operating life of the pump by extending the time after the impellers become non-floating before a maximum predetermined thrust load is applied to the axial thrust bearing.

10 Claims, 6 Drawing Figures

PATENTED APR 2 1974
3,801,215
SHEET 1 OF 2
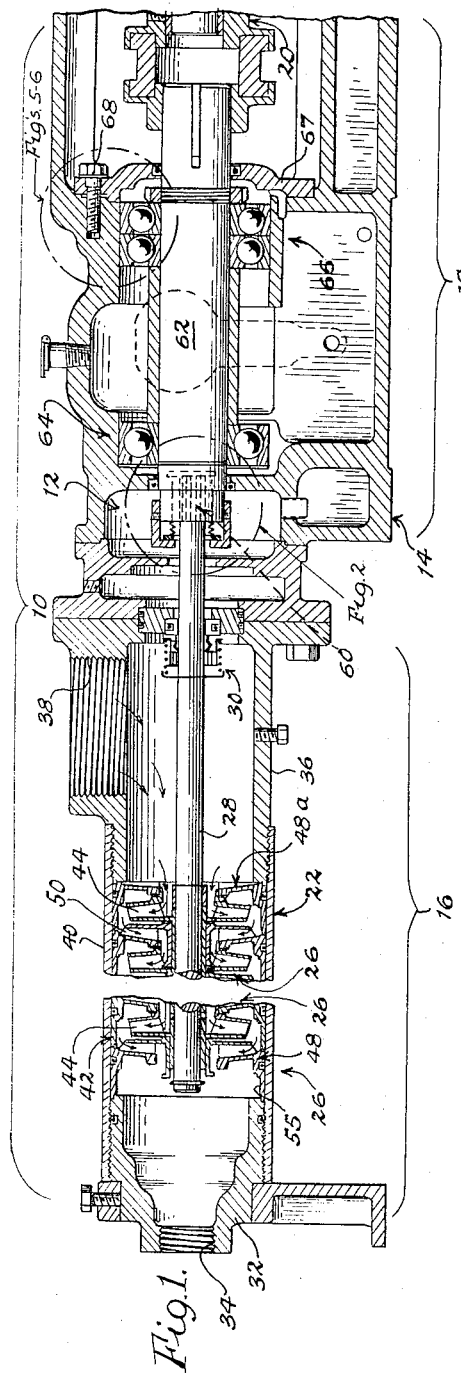
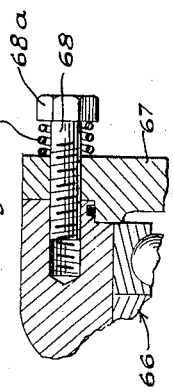
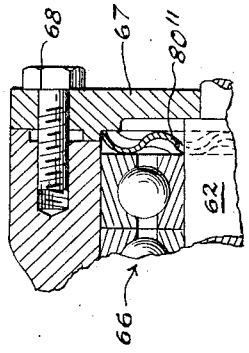
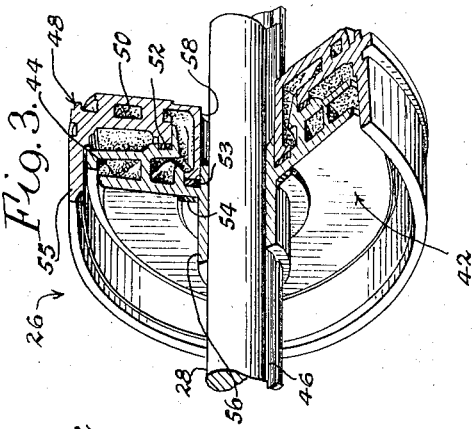
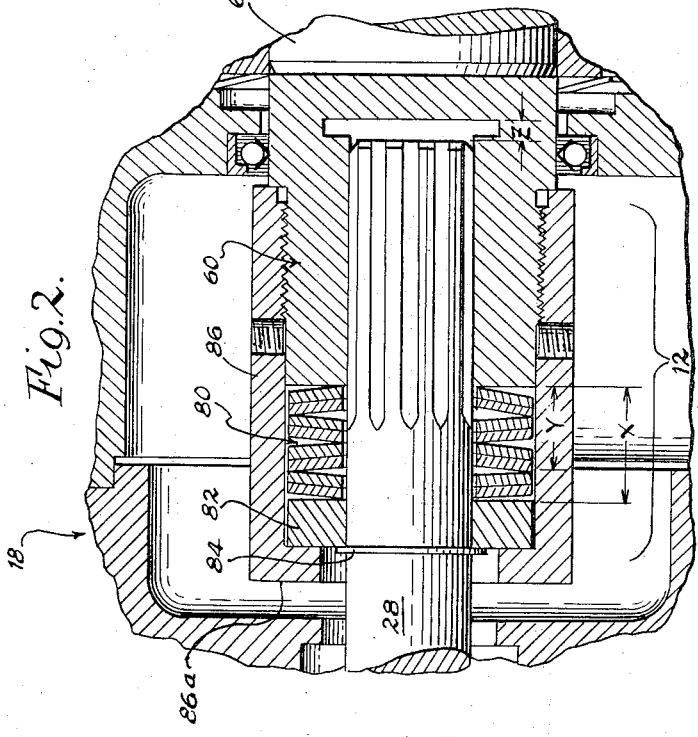

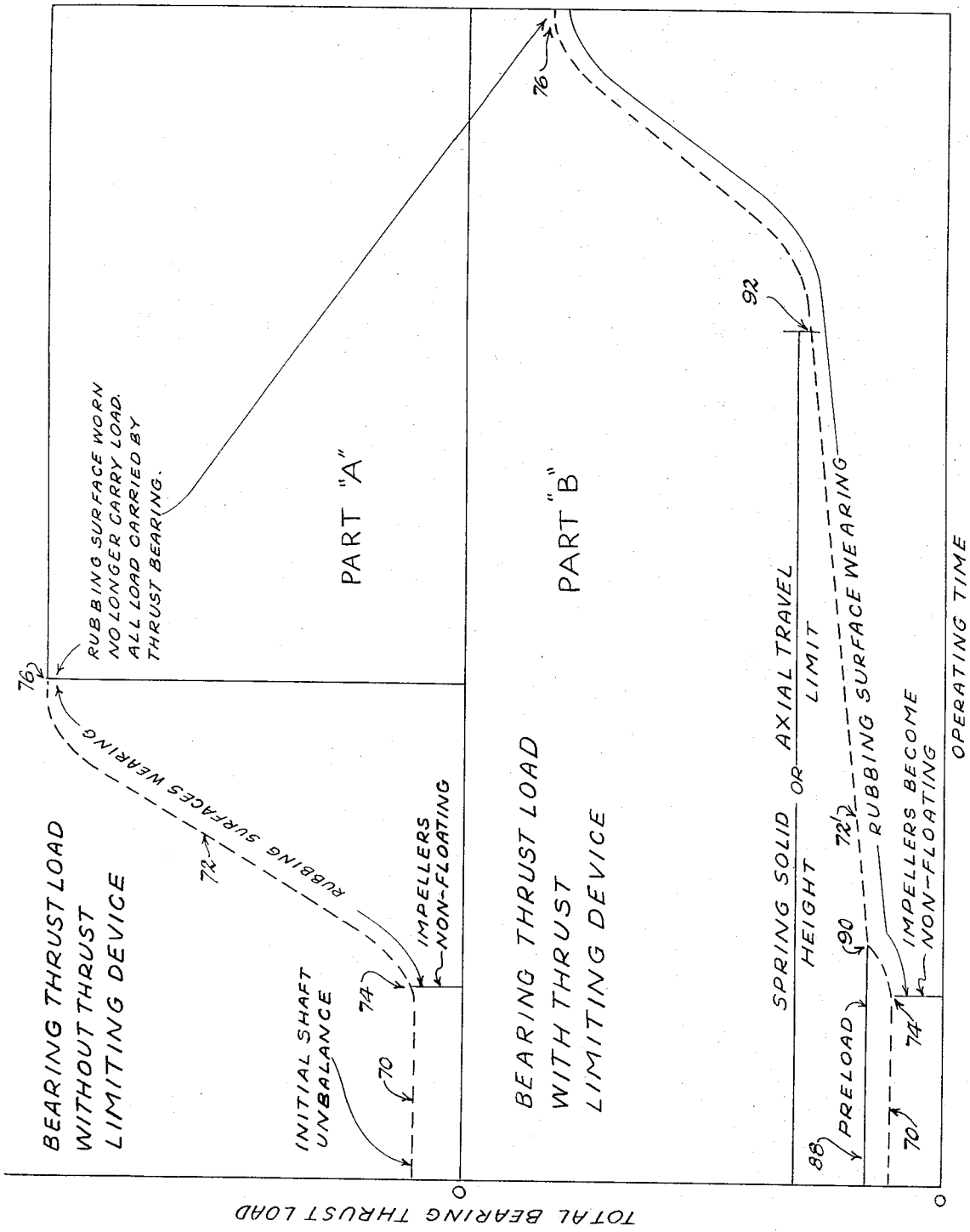

AXIAL THRUST LIMITING DEVICE

BACKGROUND OF THE INVENTION

The present invention relates to a device for limiting the maximum axial thrust on an axial thrust bearing in a multi-stage centrifugal pump employing impeller and diffuser bowl combinations of the so-called floating type disclosed for instance in U.S. Pat. No. 2,775,945.

In pumps of the type disclosed by U.S. Pat. No. 2,775,945 the axial thrust of each individual impeller is intended to be transferred to its cooperating diffuser by an associated bearing or thrust washer and the impellers are free to float axially of a pump shaft and reposition themselves axially thereof as wear of the thrust washers and/or engaged surfaces of the impeller and diffuser takes place. Under ideal circumstances, the axial thrust transferred to an axial thrust bearing assembly normally associated with the pump shaft is limited to an initial axial force produced by the fluid being pumped, that is, the product of the unit pressure at the outlet end of the pump to which the shaft is exposed and the cross-sectional area of the shaft. Since the pump shaft in present constructions is rigidly constrained from axial movement, additional axial thrust will be transferred to the shaft and imposed upon the axial thrust bearing whenever impellers lose their ability to float axially of the shaft and hence accommodate for wearing away of their associated thrust washers. With a fixed impeller and an axially fixed shaft, wear of only a thousandth of an inch or so is sufficient to destroy the ability of a thrust washer to transmit thrust between an impeller and its cooperating diffuser. Should all of the impellers become fixed to the shaft, the axial force of all of the impellers will in time be imposed upon the axial thrust bearing.

While experience shows that impellers do not become non-floating in all pump applications, a pump employing an axial thrust bearing designed to accommodate only a minimum thrust, such as the above referred to initial axial thrust, would greatly restrict the range of usefulness of such pump. On the other hand, to provide a pump with an axial thrust bearing designed to accomodate for the maximum axial thrust expected to be encountered in pump applications in which all impellers will likely become non-floating results in a very costly assembly. To design for a thrust capacity between the above extremes requires a completely arbitrary decision.

It will be understood that the present invention is not considered to broadly encompass the concept of forming a centrifugal pump with means for supporting a pump shaft for limited axial movement, since to do so is quite well known in situations where the axial thrust of a shaft is to be balanced by a differential hydraulic pressure acting upon a shaft associated balancing disc or drum. Pumps employing these thrust balancing constructions differ from that described in the above mentioned U.S. Pat. No. 2,775,945 in that their impellers are at all times rigidly constrained from movement axially of the pump shaft.

SUMMARY OF THE INVENTION

In accordance with the present invention a thrust limiting device is incorporated in a multi-stage centrifugal pump employing impeller and diffuser combinations of the so-called floating type in order to keep the axial thrust bearing load at a relatively low level for a greater period of pump operating time than heretofore possible. The present invention permits a more economical axial thrust bearing design and/or provides for a longer useful bearing life.

More specifically, the axial thrust limiting device of the present invention permits the shaft to move axially relative to the diffusers, as the thrust applied to the shaft increases as a result of impellers becoming non-floating on the shaft. In this way, the rubbing surface of the wear washers and/or diffusers are kept in contact and most of the thrust forces of the impellers continue to be carried by the diffusers and are not transmitted through the shaft to the axial thrust bearing. The impellers, which remain in a floating condition, simply adjust themselves relative to the shaft as the latter moves.

In a preferred form of the present invention the pump shaft is driven through a spline by a stub shaft, which in turn bears on an axial thrust bearing rigidly supported to transfer thrust into the pump frame; the spline allowing for axial movement of the pump shaft relative to the stub shaft and thus the diffusers. A spring, such as may be defined by one or more Belleville washers, is arranged to bear axially against the pump and stub shafts and a nut is employed to retain the pump shaft connected to the stub shaft and to compress the spring a predetermined amount. This initial spring pre-load will be slightly greater than the above referred to initial axial force on the pump shaft occasioned by the fluid pressure adjacent the pump outlet to prevent unnecessary pump shaft movement. After this initial spring pre-load is applied, the spring should be capable of being further compressed to allow the pump shaft to slide relative to the stub shaft through a certain maximum distance as the thrust load on the pump shaft increases due to the impellers becoming non-floating. This maximum distance would be determined by the maximum amount of wear that can be tolerated at the rubbing surfaces of the wear washer and/or diffuser of any pump stage.

At the outset of operation of a pump employing the present invention, all impellers are free to float axially on the pump shaft and transmit their axial thrust to the cooperating diffusers and the intiial axial load caused by the discharge pressure is transmitted through the thrust limiting device to the axial thrust bearing and hence to the pump frame. Since the spring pre-load is slightly greater than the initial axial load, the spring is not deflected. As time goes on and the impeller of one or more stages loses its ability to float and thus compensate for thrust washer wear, its axial thrust is transmitted to the pump shaft. When this additional impeller thrust in combination with the initial axial load exceeds the initial spring load, the spring will deflect and the pump shaft will move towards the stub shaft; this permitting most or all of the rubbing surfaces to be brought into contact and thereby most of the non-floating impeller thrust load to be transferred back to their respective diffusers. This process will continue until either the solid or fully compressed height of the spring is reached or the pump shaft bottoms out on the stub shaft after a measured predetermined amount of axial movement, which corresponds to maximum permissive wear in any given pump stage requiring repairs to be made. Once the solid height of the spring or the full extent of pump shaft movement is otherwise reached, the limiting device is no longer effective and additional thrust is transferred to the axial thrust bearing as in a rigid shaft construction.

Preferably, the device is designed such that repairs are made at the end of an operating period at which the total thrust loading is still within the capability of the axial thrust bearing; such operating period however, being of substantially greater duration than the operating period obtainable from a like thrust bearing of conventional pump construction exposed to the same total thrust loading.

In alternative forms of the present invention, the pump shaft would be rigidly attached to the stub shaft and the spring device would be placed between the axial thrust bearing and the pump frame. Thus, in these forms, the entire pump shaft-stub shaft and thrust bearing assembly move as a unit relative to the frame to compress the spring device.

DRAWINGS

The nature and mode of the present invention will now be more fully described in the following detailed description taken with the accompanying drawings wherein:

FIG. 1 is a sectional view of a multi-stage centrifugal pump incorporating a preferred form of the thrust limiting device of the present invention;

FIG. 2 is an enlarged view of the area designated as FIG. 2 in FIG. 1;

FIG. 3 is a fragmentary perspective view of an impeller-diffuser bowl combination;

FIG. 4 is a graphical comparison of axial thrust bearing load curves as a function of time with and without the utilization of the thrust limiting device in the present invention;

FIG. 5 is an enlarged view of the area designated as FIGS. 5–6 in FIG. 1 and showing an alternative embodiment of the present invention; and FIG. 6 is an enlarged view of the area generally designated as FIGS. 5–6 in FIG. 1, but showing a further modification of the present construction.

DETAILED DESCRIPTION

Reference is now made more particularly to FIG. 1, wherein a conventional multi-stage centrifugal pump, which is generally designated as 10, is shown as being modified by the inclusion of a thrust load limiting device of the present invention, which is generally designated as 12. Pump 10 is shown as including a horizontally elongated pump frame or framework 14, which is divided into a forward pump casing section 16 and a rear bearing frame section 18; the latter being directly connected to a pump drive motor section, not shown, from which extends a pump drive shaft 20.

Pump casing section 16, which may be of any conventional construction, is shown for purposes of reference as generally including a pump casing or housing 22; a stack of axially aligned impeller-diffuser bowl assemblies 26; a pump shaft 28; and a mechanical pump shaft seal device 30. Casing 22 may conveniently be of a three part construction, including a front casting part 32, which defines an axially opening flow outlet 34; a rear casting part 36, which defines a laterally opening flow inlet 38; and a cylindrical housing or sleeve 40, which is threadably connected adjacent its opposite ends to casting parts 32 and 36.

By reference to FIG. 3, it will be appreciated that each of assemblies 26 is of a conventional construction, such as that described in U.S. Pat. No. 2,775,945, and includes an impeller 42, which defines a plurality of radially extending flow passageways 44 and is fixed by a key connection 46 for rotation with and slight axial floating or sliding movement relative to pump shaft 28; a diffuser bowl 48, which defines a plurality of radially extending flow passageways 50; and thrust washers 52–54. Of these thrust washers, washers 52 and 53 normally serve to transmit axial thrust from the impellers to their cooperating diffuser bowls during normal pump operation, whereas thrust washer 54 serves to transmit thrust only in exceptional situations where fluid pressure at the inlet of the pump exceeds that present at its outlet.

If desired, a portion of the upstream diffuser bowl 48a may be cut away to permit flow from inlet 38 to pass axially through such diffuser towards passageways 44 of its associated impeller without first passing through passages 50. Outer sleeve portions 55 of diffuser bowls 48 of the stack are arranged to axially engage one another and are clamped between casting parts 32 and 36 concentrically inwardly of sleeve 40. With this construction, the forward end of pump shaft 28 is supported by bearing engagement of impeller hubs 56 within diffuser bowl bearing sleeves 58, and the rearward end of the pump shaft is supported by means of a splined or other assembly facilitating connection 60 with a stub shaft 62. Stub shaft 62 serves to drivingly connect pump shaft 28 to drive shaft 20, and is rotatably supported within rear bearing frame section 18 by means of a line bearing 64 and an axial thrust bearing 66. Axial thrust bearing 66 bears on the forwardly facing or inner face of an apertured cover plate 67, which is in turn clamped to section 18 by bolts 68. It will be noted by reference to FIG. 1, that sufficient spacing or clearance is provided between the ends of impeller hubs 56 of adjacent assemblies in order to permit axial movement of the impellers upon wearing of thrust washers 52 and 53 and/or their associated impeller and diffuser wear surfaces without resulting in engagement of the adjacent impellers.

In pump constructions of the type thus far described, driven rotation of pump shaft 28 effects rotation of impellers 42 relative to their cooperating diffuser bowls 48 with the result that fluid is drawn inwardly through inlet 38 and after passage serially through assemblies 26 discharged under pressure through outlet 34. In that all of impellers 42 are initially free to float axially of the pump shaft and thus reposition themselves axially relative to their cooperating diffuser bowls 48, as wear of their associated thrust washers 52 and 53 and/or thrust washer engaging surfaces of the impeller and diffuser bowl takes place, the axial thrust of each impeller is transferred to its cooperating diffuser bowl via their associated thrust washers and thereby axially to rear casting part 36 and thus pump frame 14. Under these operating conditions, and in the case of pump constructions of the type illustrated in FIG. 1 wherein the end of the pump shaft is exposed to fluid pressure adjacent outlet 34, the axial thrust transferred to the axial thrust bearing assembly 66 is limited to an initial axial force produced by the fluid being pumped. This initial axial force is a product of the unit pressure adjacent outlet 34 to which the shaft is exposed and the cross-sectional area of the shaft and is designated by line 70 in both Parts "A" and "B" of FIG. 4.

In these prior pump constructions, pump shaft 28 is rigidly constrained from axial movement, as by having its end bottomed out against the axially constrained stub shaft 62. Thus, whenever the impellers lose their ability to float and hence accommodate for wear of their associated thrust washers, their axial thrust will eventually be transferred to pump shaft 28 and thereby to axial thrust bearing 62, which in turn transfers the thrust to frame 14. Line 72 in Part "A" of FIG. 4 illustrates an arbitrary curve of axial thrust vs. operating time from a point 74 at which impellers become non-floating to a point 76 at which all of the impellers are non-floating and essentially all impeller axial thrust is transferred to the axial thrust bearing assembly due to the fact that the wear surfaces are worn to an extent sufficient to prevent transfer of thrust loads to the diffuser bowls. As will be appreciated, curve 72 is a function of thrust washer and associated surface wear rate and the rate at which the individual impellers become non-floating, and these parameters are in turn functions of particular pump application. It should also be pointed out that the thickness of fluid film required to permit transfer of thrust from the impellers to the diffuser bowls is quite small, and thus with non-floating impellers and an axially fixed shaft thrust washer wear of about 0.001 inches is normally sufficient to completely destroy the ability of the thrust washers to transmit thrust from the impellers to the diffuser bowls.

It will be understood that in accordance with a preferred embodiment of the present invention, thrust limiting device 12 is adapted to permit controlled axial movement of pump shaft 28 relative to stub shaft 62, as axial thrust applied thereto increases as a result of impellers becoming non-floating on the pump shaft and the rubbing surfaces wearing away. In this way, the partially worn rubbing surfaces are kept in contact and impeller thrust continues to be carried by the diffuser bowls, rather than the axial thrust bearing assembly, for a greater time period of pump operation.

A preferred construction of device 12 is shown in FIG. 2 as including a spring device 80, such as defined for example by a stack of Belleville washers, which is arranged axially intermediate the end of stub shaft 62 and a bearing washer 82 positioned relative to pump shaft 28, as by a pump shaft affixed split ring collar or snap ring 84. A nut 86 is adjustably threaded onto the end of stub shaft 62 for the purpose of pre-compressing spring device 80 between bearing washer 82 and the stub shaft. This initial spring preload should be slightly greater than the above described initial axial force (line 70 in Parts "A" and "B" of FIG. 4) and is designated as 88 in Part "B" of FIG. 4. In FIG. 2, "X" and "Y" are employed to designate the preload or pre-compressed and fully compressed or solid height of spring device 80, respectively, whereas "Z" is employed to designate a certain maximum distance through which pump shaft 28 may slide by means of spline connection 60 relative to stub shaft 62, as the thrust load on the pump shaft increases. The distance "Z" will preferably be less than the difference between "X" and "Y" and in any event be equal to or slightly less than the maximum amount of axial wear that can be tolerated at the thrust washer-wear surfaces of any given impeller-diffuser bowl assembly. Spring device 80 should be so designed that the thrust load or force required over the initial preload to compress the spring device through distance "Z" will be relatively small, and hence impose a relatively small additional load on axial thrust bearing 66. This additional load may be calculated and the total load carried by the axial thrust bearing at this point of pump operating time is considerably less than the total thrust load, which would be transmitted to the thrust bearing assembly of a conventionally constructed pump for a similar non-floating impeller condition.

The effect of device 12 on the thrust load applied to axial thrust bearing assembly 66 is illustrated in Part "B" of FIG. 4. It is assumed that when pump operation commences, all impellers are free to float and the initial axial thrust is transmitted through device 12 to axial thrust bearing assembly 66, as indicated by line 70. Since the spring preload, designated by line 88, is slightly greater than the initial axial thrust, spring device 80 will not deflect or be compressed beyond its initial preloaded height "X" and pump shaft 28 is initially constrained from movement towards stub shaft 62. At some point in time 74 at which one or more impellers become non-floating and the wear surfaces of such impellers become worn to the point that thrust is not transmitted to their cooperating diffusers, additional axial thrust is transmitted to the pump shaft and thus to the axial thrust bearing assembly. When this additional axial thrust, added to the initial axial thrust due to fluid pressure, exceeds the spring preload as at point 90 along arbitrary axial thrust vs. operating time curve 72', spring device 80 will deflect to permit pump shaft 28 to move towards stub shaft 62. Up to this point in time, curve 72' would correspond to curve 72.

As a result of pump shaft movement, the partially worn rubbing surfaces of assemblies 26 having non-floating impellers will be brought back into contact and most of the axial load of the non-floating impellers will be transferred back into their cooperating diffuser bowls. The impellers, which remain in floating condition, automatically reposition themselves axially of the pump shaft and continue to transmit thrust to their cooperating diffuser bowls in a normal manner. Once the solid height "Y" of the spring device is reached or pump shaft 28 has moved through distance "Z" and bottoms out on the stub shaft 62, as at point 92, device 12 is no longer effective and the curve 72' will rise sharply and be thereafter essentially identical to curve 72 up to point 76. As indicated, both curves 72 and 72' are arbitrary and depend upon wear surface wear rate and the rate at which the impellers become non-floating, which in turn depend upon pump application.

By comparing Parts "A" and "B" of FIG. 4, it will be understood that the inclusion of thrust limiting device 12 serves to extend the operating time of an otherwise conventional pump before a predetermined axial thrust is applied to axial thrust bearing assembly 66, thus permitting a more economical thrust bearing assembly design or a longer useful thrust bearing assembly life. This is achieved simply by making essentially continuous and thus more effective use of the thrust washers of assemblies 26 for thrust transfer purposes, until such time as the wear surfaces of one of such assemblies has been worn to a given maximum extent requiring actual replacement or repair thereof. This is to be compared with prior pump constructions, wherein maximum axial thrust loads are applied to the thrust bearing assembly at a point in time before wearing surfaces of the assemblies possessing similar total wear capabilities have been worn to an extent requiring replacement.

If desired, maximum permissive wear or travel of pump shaft 28 through distance "Z" may be visually determined by providing a reference mark on the pump shaft and periodically inspecting the pump to determine when such mark is radially aligned with a suitable stationary reference point, such as the front end surface 86a of nut 86. Alternatively, the operating temperature of the axial thrust bearing assembly, which varies according to thrust loading conditions, may be used as a convenient indicator.

An alternative form of the present invention, which is illustrated in FIG. 5, may be employed in pump constructions wherein the pump shaft 28 and stub shaft 62 are integrally formed or otherwise non-movably interconnected. In this form a spring device in the form of coil or other suitable springs 80' would be arranged concentrically of bolts 68 to axially bear against the rear or outer surface of cover plate 67 and bolt head 68a, and pre-compressed by adjustments of their associated bolts. When the axial thrust applied to assembly 66 exceeds the preload of coil springs 80', the springs compress to permit simultaneous movement of the pump and stub shaft, assembly 66 and cover plate 67 relative to the stationary pump frame.

Another alternative form of the invention shown in FIG. 6 functions in a manner similar to the embodiment of FIG. 5, except that the spring device is in the form of a spring "wave" disc or washer 80" arranged between movable supported assembly 66 and stationary cover plate 67. Further, in FIG. 6 spring 80" is shown as being subject to maximum deformation with stub shaft 62 bottomed out on cover plate 67 to define the limit or maximum permissive travel of shafts 28 and 62.

I claim:

1. In a multi-stage centrifugal pump including a pump frame, a pump shaft, an axial thrust bearing means and pairs of cooperating diffusers and impellers having associated bearing means, means for keying each of said impellers for rotational movement with and axial floating movement relative to said pump shaft and characterized in that while an impeller remains in a floating condition its thrust load is transferred through its associated bearing means to its cooperating diffuser and thereby to said pump frame and when in a non-floating condition its thrust load is applied to said pump shaft and thereby to said pump frame through said axial thrust bearing means after wearing of its associated bearing means prevents transfer of its thrust load to its cooperating diffuser as aforesaid, means for prolonging the overall operating time of said pump by extending the time after impellers become non-floating before a maximum pre-determined thrust load is applied to said axial thrust bearing means through said pump shaft by the non-floating impellers, which last mentioned means comprises in combination:

shaft movement control means for permitting a pre-determined axial movement of said pump shaft relative to said diffusers in response to axial thrust load applied to said pump shaft as a result of impellers becoming non-floating, thereby tending to maintain said cooperating diffusers and impellers including non-floating impellers in thrust load transferring relationship through their associated bearing means.

2. The improvement according to claim 1, wherein said movement control means is pre-loaded, whereby to constrain axial movement of said pump shaft as aforesaid until a minimum predetermined thrust load is applied to said pump shaft by said impellers.

3. The improvement according to claim 1, wherein said predetermined axial movement is substantially equal to or less than the maximum permissive wear of any one of said bearing means in a direction aligned with the direction of axial movement of said pump shaft and movement of said pump shaft is essentially proportional to the thrust load applied thereto as a result of impellers becoming non-floating.

4. The improvement according to claim 3, wherein said movement control means is pre-loaded, whereby to constrain axial movement of said pump shaft as aforesaid until a minimum predetermined thrust load is applied to said shaft by said impellers.

5. The improvement according to claim 1, wherein said movement control means includes spring means resiliently deformable to permit axial movement of said pump shaft as aforesaid, and said predetermined axial movement is substantially equal to or less than the maximum permissive wear of any one of said bearing means in a direction aligned with the direction of axial movement of said pump shaft.

6. The improvement according to claim 1, wherein said movement control means includes a splined coupling for connecting said pump shaft for rotational movement with and axial movement relative to a stub shaft connected in turn to said axial thrust bearing means and spring means resiliently deformable to permit axial movement of said pump shaft relative to said stub shaft and said axial thrust bearing means.

7. The improvement according to claim 6, wherein said spring means includes at least one Belleville washer, said movement control means further includes means for pre-loading said Belleville washer thereby to constrain axial movement of said pump shaft as aforesaid until a minimum predetermined thrust load is applied to said pump shaft by said impellers, and said predetermined axial movement is equal to or less than the maximum permissive wear of any one of said bearing means in a direction aligned with the direction of axial movement of said pump shaft.

8. The improvement according to claim 1, wherein said movement control means includes resilient means for movably coupling said axial thrust bearing means to said pump frame, whereby to permit axial movement of said pump shaft as aforesaid.

9. The improvement according to claim 1, wherein said pump frame includes a pump frame section for housing said pairs of cooperating diffusers and impellers and a bearing frame section for housing said axial thrust bearing assembly for sliding movement in a direction aligned with the axis of rotation of said pump shaft, said bearing frame section having a cover plate member for retaining said axial thrust bearing assembly therewithin and for transferring thrust load imposed thereon to said pump frame, said axial thrust bearing assembly is coupled to said pump shaft for conjunctive axial movement therewith, and said movement control means includes resiliently deformable means arranged intermediate said axial thrust bearing assembly and said cover plate in said direction of sliding movement.

10. The improvement according to claim 1, wherein said pump frame includes a pump frame section for housing said pairs of cooperating diffusers and impellers and a bearing frame section for housing said axial thrust bearing assembly for sliding movement in a direction aligned with the axis of rotation of said pump shaft, said bearing frame section includes a cover plate member for retaining said axial thrust bearing assembly therewithin and for transferring thrust load imposed thereon to said pump frame, said axial thrust bearing assembly is coupled to said pump shaft for conjunctive axial movement therewith, and said movement control means includes mounting means for mounting said cover plate member on said bearing frame section for movement in said direction and resiliently deformable means arranged intermediate said mounting means and said cover plate member whereby to permit axial movement of said pump shaft as aforesaid.

* * * * *